US010493575B2

(12) United States Patent
Hediger (10) Patent No.: US 10,493,575 B2
(45) Date of Patent: Dec. 3, 2019

(54) CLAMPING CHUCK

(71) Applicant: Erowa AG, Reinach (CH)

(72) Inventor: Hans Hediger, Reinach (CH)

(73) Assignee: Erowa AG, Reinach (CH)

( * ) Notice: Subject to any disclaimer, the term of this patent is extended or adjusted under 35 U.S.C. 154(b) by 0 days.

(21) Appl. No.: 15/944,136

(22) Filed: Apr. 3, 2018

(65) Prior Publication Data

US 2018/0304428 A1 Oct. 25, 2018

(30) Foreign Application Priority Data

Apr. 21, 2017 (CH) ..................................... 00533/17

(51) Int. Cl.
*B23Q 17/00* (2006.01)
*B23Q 1/00* (2006.01)
*B23B 31/107* (2006.01)

(52) U.S. Cl.
CPC ........ *B23Q 1/0072* (2013.01); *B23B 31/1071* (2013.01); *B23Q 17/005* (2013.01); *B23Q 17/006* (2013.01); *Y10T 279/17752* (2015.01); *Y10T 279/21* (2015.01)

(58) Field of Classification Search
CPC .. B23Q 1/0072; B23Q 17/005; B23Q 17/006; B23B 31/1071; B23B 31/30; B23B 31/302; B23B 31/16158; B23B 31/16179; Y10T 279/1208; Y10T 279/21; Y10T 279/1291; Y10T 279/17752
See application file for complete search history.

(56) References Cited

U.S. PATENT DOCUMENTS

| | | | | |
|---|---|---|---|---|
| 4,536,000 A * | 8/1985 | Rohm | ................. | B23Q 1/0009 279/110 |
| 4,909,521 A * | 3/1990 | Ovanin | ................. | B23Q 1/0009 279/111 |
| 6,940,276 B2 * | 9/2005 | Shafiyan-Rad | .......... | B23Q 3/06 269/32 |
| 7,377,505 B2 * | 5/2008 | Yonezawa | ............ | B23Q 1/0063 269/309 |
| 7,878,070 B2 * | 2/2011 | Weller | ................. | B23B 31/207 73/760 |

(Continued)

FOREIGN PATENT DOCUMENTS

| | | | | |
|---|---|---|---|---|
| DE | 102011080504 A1 * | 2/2013 | .......... | B23Q 1/0072 |
| EP | 2759372 B1 * | 11/2014 | .......... | B23Q 17/005 |

OTHER PUBLICATIONS

Machine translation, German Patent Document, DE102011080504 A1, Jaeger eta l., Feb. 7, 2013. (Year: 2013).*

*Primary Examiner* — Eric A. Gates
*Assistant Examiner* — Chwen-Wei Su
(74) *Attorney, Agent, or Firm* — Maginot, Moore & Beck, LLP (57) ABSTRACT

The invention relates to a clamping chuck for clamping pallets furnished with a clamping spigot. The clamping chuck has a locating opening for the clamping spigot and a clamping device for clamping the clamping spigot in the locating opening. A plurality of sensors are arranged on the clamping chuck, by means of which the clamping force actions on the clamping spigot may be determined as well as other values. The clamping chuck is equipped with a transmitter for wireless transmission of parameters detected by means of the one or more sensors.

13 Claims, 7 Drawing Sheets

(56) References Cited

U.S. PATENT DOCUMENTS

| | | | |
|---|---|---|---|
| 8,256,773 B2* | 9/2012 | Sandmeier | B23Q 1/0072 |
| | | | 279/123 |
| 9,669,469 B2* | 6/2017 | Lin | B23B 31/1071 |
| 9,863,456 B2* | 1/2018 | Canuto | B23Q 1/0072 |
| 2011/0006490 A1* | 1/2011 | Puppala | B23B 31/14 |
| | | | 279/126 |
| 2013/0147133 A1* | 6/2013 | Kaleja | B23B 31/1627 |
| | | | 279/126 |
| 2016/0059424 A1* | 3/2016 | Zachary | B23B 31/30 |
| | | | 483/1 |

* cited by examiner

CLAMPING CHUCK

PRIORITY CLAIM

This application claims priority to Swiss Application No. 00533/17, entitled "CLAMPING CHUCK", filed in the name of the same inventor and applicant on Apr. 21, 2017, the entire disclosure of which is incorporated herein by reference.

The present invention relates to a clamping chuck.

Clamping chucks of the type under discussion here are used to clamp pallets and/or workpiece carriers so that they are immobilised in a defined position. In this context, the respective clamping chuck is typically mounted securely on the machine bench of a processing machine while the pallet can be secured immovably and repeatedly in a precise position by the clamping chuck. While the pallet is equipped with a clamping spigot, the clamping chuck has a locating opening and a clamping device for clamping the clamping spigot in the locating opening. The pallet usually carries a workpiece to be processed or a tool.

In order to be able to use such a clamping chuck in semi- or fully automatically running work processes, it must be possible for the pallet to be inserted in the clamping chuck and removed from it again by means of a handling robot. At the same time it is important that the pallet is secured on the clamping chuck with a minimum clamping force, and the clamping elements of the clamping chuck must have also been completely released and unlocked again before the pallet is removed. If the pallet is not fixed in the clamping chuck correctly, for example, there is a risk of vibration or even that it may become detached while the workpiece secured on it is undergoing mechanical processing, during a milling process for example, which can lead to considerable consequential damage. If the workpiece carrier is to be lifted off the clamping chuck after the processing operation, again it must be ensured that the locking mechanism has been completely unlocked, that is to say it is fully released, so that the workpiece carrier can be lifted off the clamping chuck without consequential damage. Of course, lifting a workpiece carrier off when the clamping elements are not fully unlocked can also lead to consequential damages and considerable costs.

A clamping device with a clamping chuck for detachable fixing of a workpiece carrier is known from EP 2 052 808 A1. The clamping chuck is equipped with a locking mechanism comprising a plurality of clamping elements, which engage in a clamping spigot connected to workpiece carrier when in the in the locking position. Each clamping element is provided with a through hole, which is closed off at one side when the respective clamping element is locked correctly. In addition or alternatively thereto, an actuating element furnished with a through hole is assigned to each clamping element, and the through hole on the actuating element is closed off on one side when the associated clamping element is locked and/or unlocked correctly. The through holes of the clamping elements and the actuating elements are connected to a pneumatic source via a common connecting line. At least one sensor is provided in the connecting line to capture the airflow. With the sensor, it is possible to detect whether the clamping elements have been unlocked, and/or locked correctly. The sensor is connected to an electronic control and evaluation device.

Although such a clamping device has proven effective in practice, it would be desirable if the one or more parameters/data elements captured by a sensor could be forwarded simply to a transfer point for collection, evaluation or further processing.

A clamping device for a machine tool is also known from EP 2 759 372 A1. The machine tool has a rotating spindle with a tool holder for a tool. A clamping device is provided in order to clamp the tool. The clamping device is equipped with force sensors at various measurement points to capture the clamping forces acting at each of the various measurement points, to detect whether the tool has been clamped correctly or incorrectly in the tool holder. The force sensors are arranged on an annular bearing surface of the tool holder. The sensors project above the bearing surface in such manner that they are pressed together when the tool is clamped. The purpose of this is both to enable the clamping force to be captured and to detect whether the tool has been clamped correctly or whether a misalignment and/or incorrect positioning has occurred. The force sensors used are surface acoustic wave (SAW) sensors. The force sensors are arranged on the bearing surface rotationally symmetrically about the centre axis of the machine tool. When the tool is aligned correctly, the force sensors capture clamping forces of equal strength, but if a tool is not clamped straight clamping forces of different strength are captured by the force sensors. The electrical signals of the sensors are transmitted wirelessly to a transmitting and receiving unit and evaluated in an evaluation unit.

Finally, EP 2 457 688 A1 discloses a method for positioning and fixing workpieces. The presence and/or absence of workpieces or workpiece carriers can be detected by means of process steps.

The object of the invention is to provide a clamping chuck belonging in the technical area described in the introduction, with which it is possible to reliably capture one or more parameters, particularly such parameters that monitor or indicate clamping and/or contacting and/or releasing of the pallet, and transmit them to a receiver without the need for the presence of data lines.

The solution to this object is defined with the features of claim 1. According to the invention, the clamping chuck for clamping pallets furnished with a clamping spigot has a locating opening for the clamping spigot and is equipped with a clamping device having clamping elements for clamping the clamping spigot in the locating opening, wherein at least one sensor is arranged on the clamping chuck, by means of which at least one parameter of the clamping chuck and/or of the pallet and/or of the interaction between the pallet and clamping chuck may be captured, and wherein the clamping chuck is equipped with a transmitter for wireless transmission of parameters detected by means of the one or more sensors.

The fact that the clamping chuck is equipped with a transmitter for wireless transmission of parameters detected by means of the one or more sensors means that the detected parameters can be received and evaluated remotely from the clamping chuck without necessitating the presence of data lines therefor. The transmitted data may be received by a receiver and forwarded from there to any other devices, such as for example an electronic transfer point. This is advantageous on the one hand for the purposes of automated workflows, in which the pallets are swapped in and out by a handling robot, since the measurement data can be transmitted to the robot by the transfer point in the form of control commands. On the other hand, significant parameters such as the correct clamping of the pallet in the clamping chuck can also be monitored and/or evaluated continuously and optionally linked with further parameters.

Preferred embodiments and further developments of the clamping device are described in the dependent claims.

Thus in a preferred further development it is provided that the clamping chuck is equipped with a first sensor, by means of which the clamping force acting on the clamping spigot may be determined. A qualitative statement regarding a correct clamping of the pallet may be made on the basis of the clamping force acting on the clamping spigot, which is advantageous for purposes of an automated workflow and at the same time ensures increased safety.

The first sensor is preferably designed and arranged on the clamping chuck in such manner that when a pallet is clamped elastic material deformations of the clamping chuck are measurable. The measurement of the elastic material deformation of the clamping chuck represents a particularly simple option for drawing conclusions with regard to the clamping force—i.e., the force with which the pallet is clamped to the clamping chuck.

The clamping chuck is particularly preferably equipped with a second sensor, by means of which the positioning of a pallet on the clamping chuck is detectable. The detection as to whether a pallet is positioned on the clamping chuck is again advantageous for the purposes of automated workflow, since it may serve to issue the release to the clamping chuck to clamp the pallet, for example.

In another preferred further development, the clamping chuck is equipped with a third sensor, by means of which the position of an element serving to actuate the clamping elements may be detected. With this, it may be determined whether the clamping elements are in the released position, which is important for purposes of automated pallet changing, since the pallet cannot or must not be removed until said element is no longer pressing the clamping elements into the clamping position.

In a particularly preferred further development, the second sensor is arranged in the area of the upper side of the clamping chuck in such manner that the presence of a pallet above it is detectable. This arrangement of the sensor is particularly advantageous, since such a sensor can be mounted and designed relatively simply.

A preferred further development of the clamping chuck provides that the clamping device thereof is equipped with an actuating piston which is displaceable between a starting and a locking position for actuating the clamping elements, wherein the actuating piston pushes the clamping elements radially inwards in the locking position, so that they bear on the clamping spigot in force locking manner, and wherein the third sensor is arranged inside the clamping chuck in such manner that the position of the actuating piston is detectable in the starting position. At all events, with the sensor it is possible to detect reliably whether the actuating piston has been displaced into the starting position, so that the clamping elements are also in the open position, or at least that they can be pushed back into the open position. With a sensor it is also relatively simple to determine a defined position of the actuating piston, in particular the starting position thereof.

The first sensor is particularly preferably a sensor based on a strain gauge (DMS). DMS sensors are relatively inexpensive, have high resolution and allow very accurate measurement results.

The first sensor is attached to the clamping chuck preferably at least in force-locking manner, particularly preferably at least in force-locking and in bonded manner, so that its signal is substantially proportional to the clamping force. In this way, a statement regarding the clamping force may be made directly.

The first sensor is most particularly preferably arranged in the radial direction between a circular line intersecting the Z-supports for the pallet and the locating opening of the clamping chuck. This arrangement has proved to be particularly advantageous for purposes of high resolution and measurement accuracy.

A further particularly preferred further development provides that the clamping chuck is furnished with a hollow-cylindrical extension which radially delimits the locating opening, wherein the extension is furnished with radial boreholes in which the clamping elements are braced in form-fitting manner in the Z-direction. This design is not only extremely sturdy and stable but it also supports an elastic material deformation proportional to the clamping force of the area in which the first sensor is arranged.

The actuating piston is preferably displaceable into the locking position by means of compression springs and into the starting position pneumatically against the force of the compression springs. This design ensures that the pallet is and will remain securely clamped to the clamping chuck even if the pneumatic system fails.

In another preferred further development of the clamping chuck it is provided that a microprocessor control is integrated in the clamping chuck, by means of which the data collected by the sensors is evaluated and/or processed before it is transferred to the transmitter. This design enables the measured data to be processed further particularly simply.

Finally, according to a preferred further development the clamping chuck is equipped with a power supply, particularly in the form or batteries or rechargeable batteries. This enables electrical power to be supplied to the transmitter and the sensor(s) and any other electrical or electronic components. In this respect, such a clamping chuck may be operated automatically to the extent that it does not need to be connected to a voltage source.

The following detailed description and the entirety of the patent claims will be disclosed further advantageous embodiments and combinations of features of the invention.

The figures of the drawings serving to explain an embodiment show.

Figure 1:
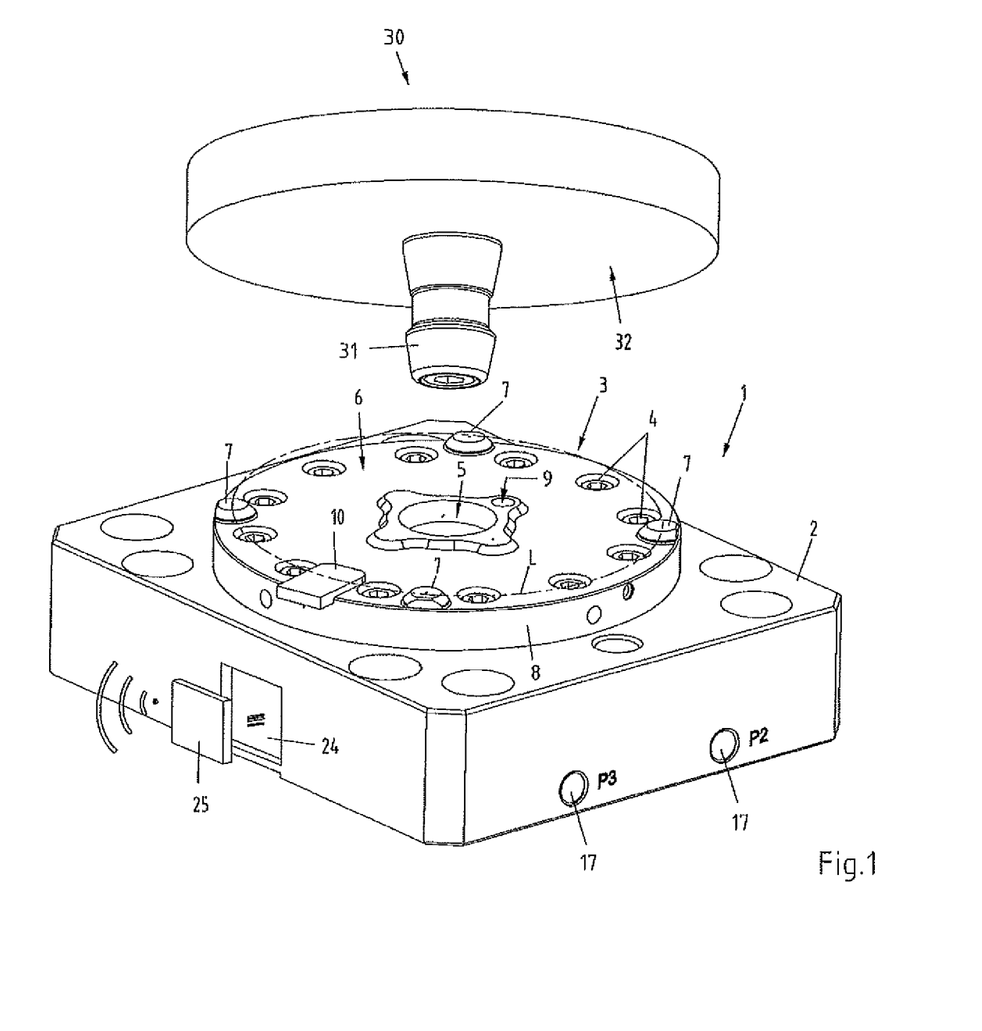
FIG. 1 a perspective view of the clamping chuck together with a pallet.

FIG. 1 shows a perspective view of the clamping chuck 1 together with a pallet 30. The clamping chuck 1 substantially comprises a base plate 2 and a chuck inner part 3, while the pallet 30 is equipped with a clamping spigot 31 for clamping in the chuck inner part 3. The chuck inner part 3 is connected to the base plate 2 via a plurality of fixing screws 4. The inner part 3 of the clamping chuck 1 is provided with a locating opening 5 for the clamping spigot 31. On its upper side 6, the chuck inner part 3 has a round cover plate 8, on which four circular bearing surfaces 7 are arranged, forming the Z-support for the pallet 30. The Z-supports 7 are raised above the flat top surface 6 of the chuck inner part 3. The pallet 30 has a flat underside 32, which rests on the Z-supports 7 when the pallet is clamped to clamping chuck 1. Each of these Z-supports 7 has a discharge opening. In general, the X-Y plane in such a clamping chuck 1 extends parallel to the top side/surface 6 of the clamping chuck 1, whereas the Z-direction extends at right angles thereto. At the same time, the Z-direction extends parallel to the longitudinal centre line of the locating opening 5. Centring means (not shown in greater detail) are provided for centring the pallet 30 in the X-Y direction. In this context, the term pallet is used representatively for any kind of carrier on which a tool or workpiece can be secured.

A first sensor 9, represented schematically, is arranged in the area of upper side 6 of the clamping chuck 1 and is accommodated in a borehole created in the top cover plate 8. This first sensor 9 is designed and connected to the clamping chuck 1 or the top cover plate 8 thereof in such manner that elastic material deformations of the clamping chuck 1, specifically of the top cover plate 8, may be measured therewith. The first sensor 9 is connected to the top cover plate 8 at least in force-locking manner, preferably in force-locking and material-bonded, optionally also in form-locking manner, preferably welded or adhesively bonded. The first sensor 9 is arranged radially between a circular line L which intersects the Z-supports 7 and the locating opening 5.

A second sensor 10 with which the bearing or presence of a pallet 30 may be detected is arranged on the top side of the clamping chuck 1. The top side of this second sensor 10 is positioned slightly lower than the top side of the Z-supports 7, so that a pallet 30 does not rest on the second sensor 10 when it is deposited on the clamping chuck 1. The clamping chuck 1 also has a third sensor, not shown in this view, which will be explained in more detail later in this document.

The base plate 2 is furnished with a recess 24 on the side, which serves to accommodate a transmitter 25. Batteries or rechargeable batteries are preferably provided to supply energy to the transmitter 25, and may preferably be fitted in a separate battery compartment in the base plate 2, neither the batteries nor the battery compartment being shown in detail here. Optionally, a mains adapter or a device for converting energy from the environment (energy harvesting) may be provided. The base plate 2 is also furnished with lateral ports 17, through which compressed air is fed to actuate the clamping device, in particular to open the clamping device. The compressed air may also be used to clean bearing surfaces by blowing them off and/or apply further clamping force for the clamping device.

Figure 2:
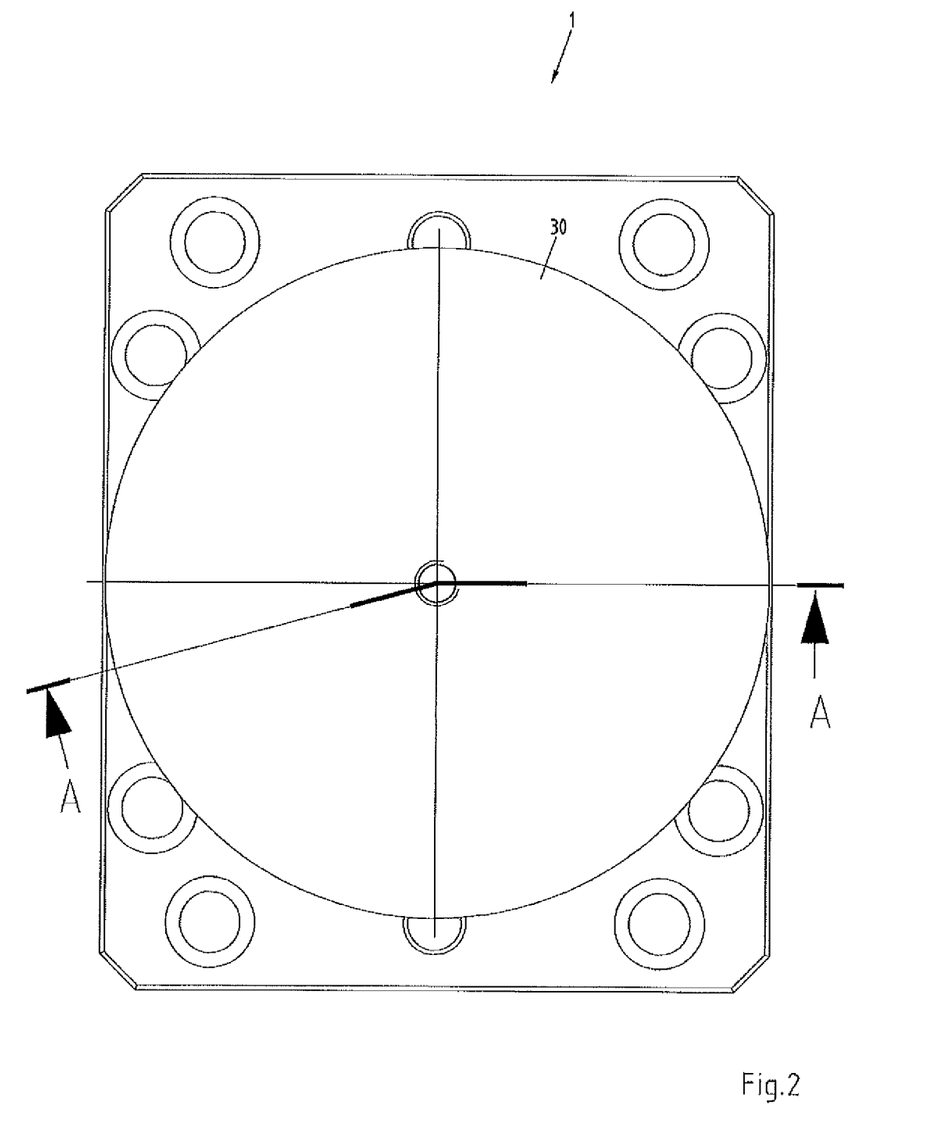
FIG. 2 a view from above of the clamping chuck together with the pallet accommodated therein.

FIG. 2 shows a view from above of the clamping chuck 1 together with the pallet 30 mounted therein. This representation serves to show the course of cross section A-A for the following illustrations.

Figure 3:
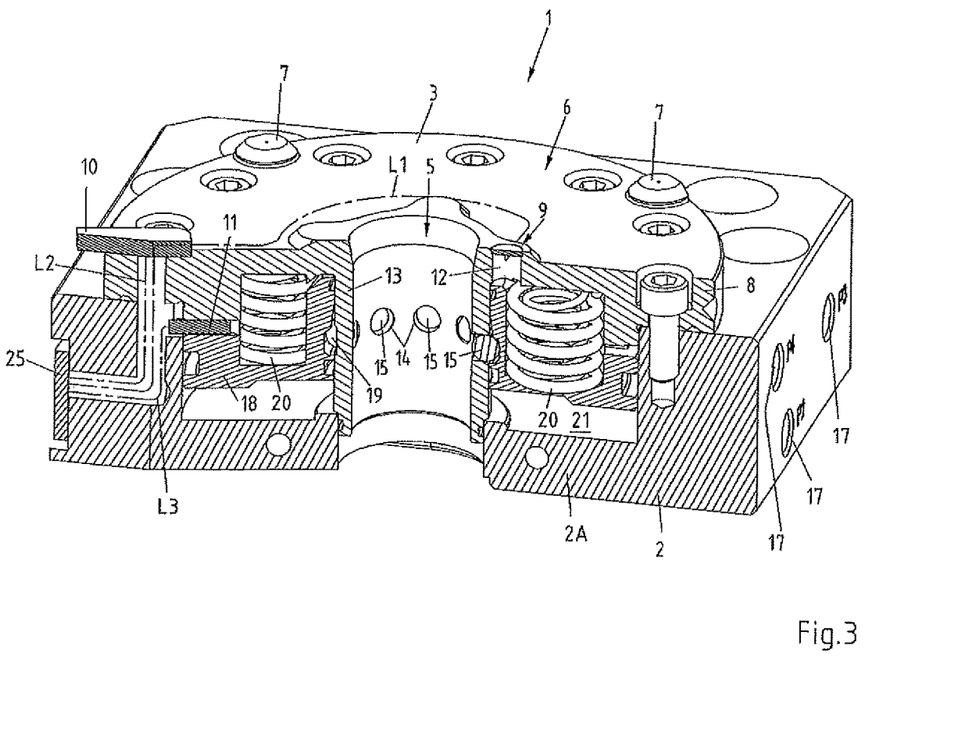
FIG. 3 the abstracted clamping chuck in a cross section along line A-A in FIG. 2.

FIG. 3 shows a perspective view of the clamping chuck 1 in a cross-section along line A-A of FIG. 2. Since the construction and operating principle of such a clamping chuck 1 are basically known, from EP 1 344 599 A1 for example, particularly in the following only a few or a few essential components of the clamping chuck 1 will be discussed. The central locating opening 5 of the clamping chuck 1 is delimited by a hollow-cylindrical extension 13, which is constructed as a single part with the cover plate 8 and extends vertically downwards towards the bottom 2A of the base plate 2. The clamping chuck 1 is furnished with a clamping device which consists essentially of an actuating piston 18 that is biased by compression springs 20, and of clamping elements in the form of clamping balls 15. The hollow-cylindrical extension 13 has radial boreholes 14 in which the clamping balls 15 fit. The clamping balls 15 are supported in the axial or Z-direction on the hollow-cylindrical extension 13. The actuation of the clamping balls, i.e., the radial displacement of the clamping balls 15 is caused by the actuating piston 18, which is biased downwards towards the bottom 2A of the base plate 2 by means of the compression springs 20. A pressure chamber 21 is also arranged in base plate 2, and may be pressurised with compressed air in order to shift the actuating piston 18 against the force of the springs 20.

This view shows that the first sensor 9 is accommodated in a bore hole 12 which is created in the cover plate 8. In addition to the second sensor 10, a third sensor 11 may also be seen, arranged on the underside of the top cover plate 8 of the clamping chuck 1. This third sensor 11 serves to detect the position of the actuating piston 18.

The first sensor 9 is designed and connected to the clamping chuck 1 or the top cover plate 8 thereof in such manner that it may serve to measure elastic material deformations of the clamping chuck 1, specifically of the top cover plate 8. It may also be seen that the first sensor 9 is arranged radially outside the locating opening 5 but inside the Z-supports 7.

The second and third sensors 10, 11 are preferably sensors that function inductively in the form of inductive proximity switches, by means of which the position of a pallet or of the actuating piston 18 is detectable. The first sensor 9 is preferably a sensor based on strain gauges, hereinafter referred to as a DMS sensor, by means of which elastic material deformations of the clamping chuck 1 may be measured, thereby allowing qualitative statements to be made about the clamping condition of a pallet at the clamping chuck 1, as will be explained in greater detail below. Each of the three sensors 9, 10, 11 is connected to the transmitter 25 via an electrical conductor L1, L2, L3, wherein said three conductors L1, L2, L3 are only indicated schematically. The transmitter 25 serves particularly to ensure the wireless transmission of the signals requiring delivery at the sensors 9, 10, 11. Although for the sake of simplicity only a transmitter is referred to in each case here, the transmitter 25 preferably comprises a microprocessor control as well, by means of which the sensor signals may be processed, and optionally supplied with further information such as the battery status for example. The processed sensor signals are transmitted wirelessly by means of the transmitter 25.

Figure 4:
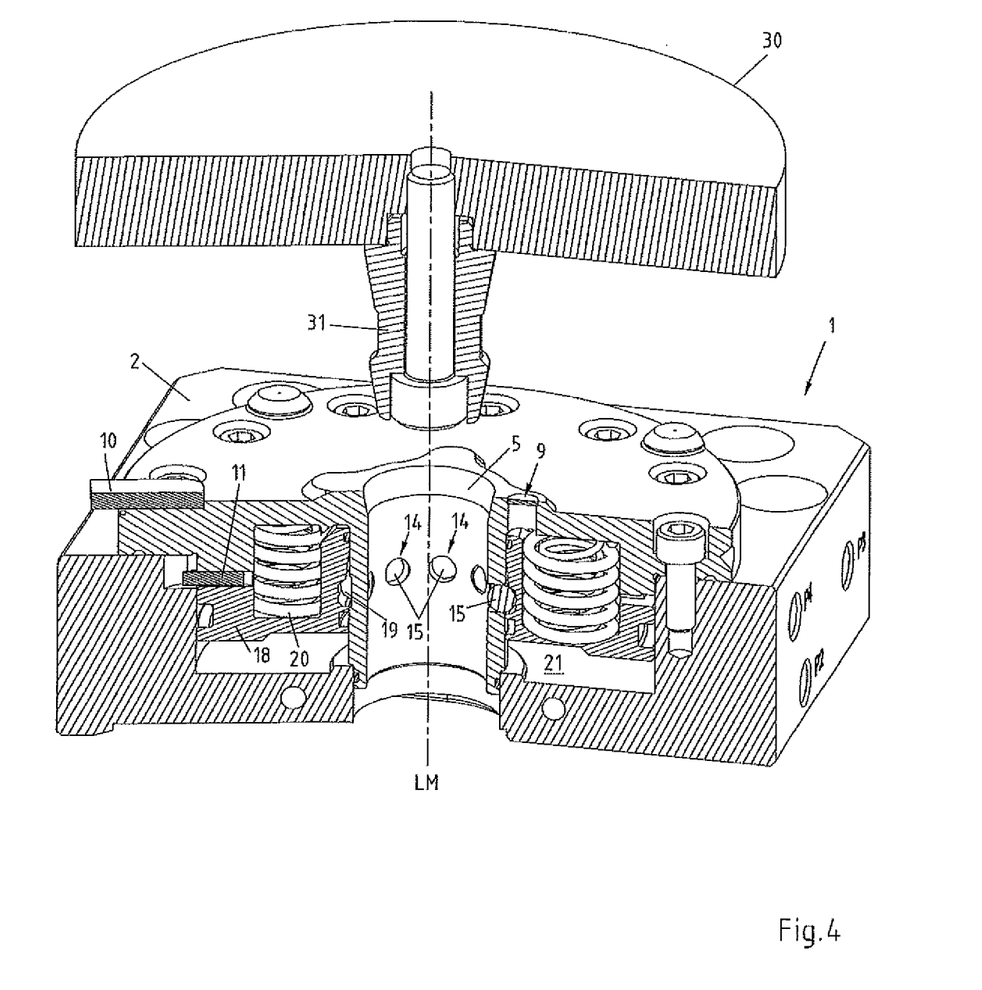
FIG. 4 a simplified representation of the clamping chuck together with the pallet lifted off in a cross section along line A-A in FIG. 2.

FIG. 4 shows a cross-section along line A-A in FIG. 2 of the clamping chuck 1 together with the pallet 30 raised off the chuck, wherein the transmitter and the connecting lines are not represented. To ensure that the clamping spigot 31 can be inserted in the locating opening 5 far enough to enable it to be clamped securely, the actuating piston 18 must have been displaced into the raised position—the starting position—shown in FIG. 4. For this purpose, a corresponding overpressure is built up inside the pressure chamber 21 pneumatically. This makes it possible for the clamping balls 15 to be pushed radially outwardly far enough to extend into a recess 19 in the actuating piston 18 formed by a circumferential annular groove. Even if the clamping balls 15 still extend into the locating opening 5 when the clamping spigot 31 is introduced, they are forced back transversely to the longitudinal center line LM by the clamping spigot 31.

In the view according to FIG. 4, it is detected by means of the third sensor 11 that the actuating piston 18 is in its raised position, while the second sensor 10 detects that a pallet 30 is not positioned on top of clamping chuck 1. Consequently, a "1" signal exists at the third sensor 11, while a "0" signal exists the second sensor 10. At the first sensor 9 there is a signal which is proportional to the deformation of the clamping chuck 1. The pending signals are transmitted wirelessly by the transmitter to a receiver (not shown). The receiver may be part of a machine controller, for example, via which a handling robot (not shown) is actuated. The actual status of the clamping chuck 1 may be detected on the basis of the signals which are pending at the three sensors 9, 10, 11 and are transmitted to the receiver. In the present case, it is detected that the clamping chuck 1 is in the open position, but no pallet 30 has been placed on it or clamped securely in it. Consequently, a release to transfer a pallet 30 to the clamping chuck 1 can be issued to the handling robot.

Figure 5:
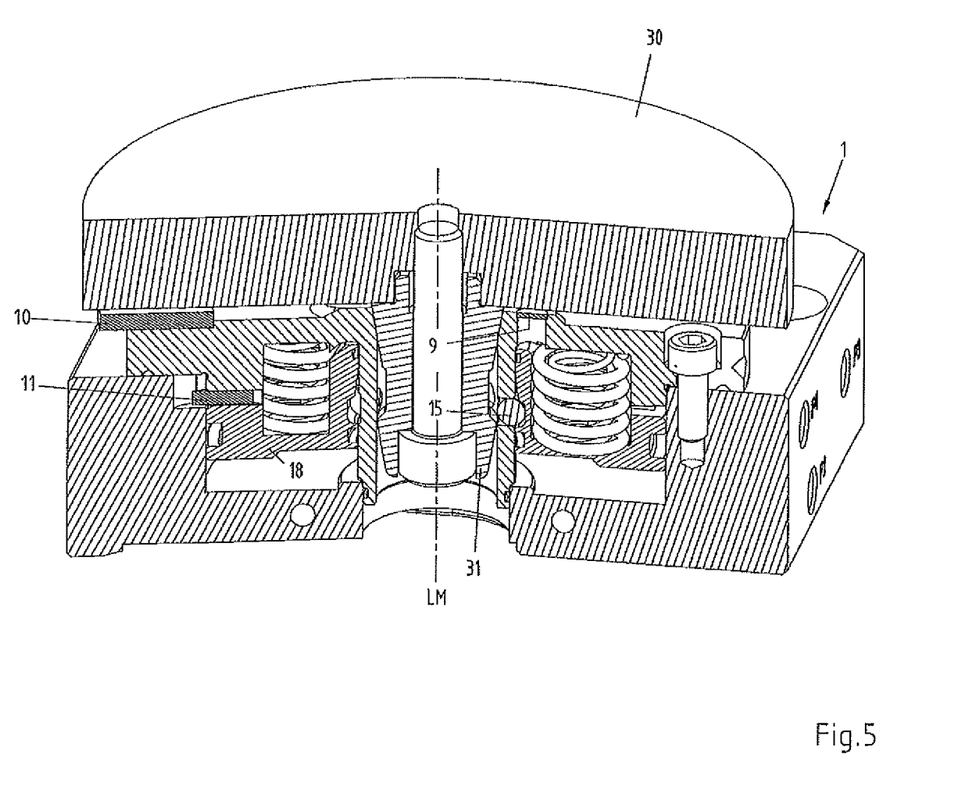
FIG. 5 the abstracted clamping chuck together with the pallet positioned thereon without clamping.

FIG. 5 shows a cross-section along line A-A in FIG. 2 of the clamping chuck 1 together with the pallet 30 placed on the clamping chuck 1 but not clamped securely therein. The pallet 30 lies unsecured on the clamping chuck 1, which is to say under its own dead weight and the weight of any workpiece or tool fastened to it. The actuating piston 18 still remains in its raised position, in which the clamping balls 15 are pushed radially outwards. As a result, the clamping balls 15 are not yet exerting a clamping force on the clamping spigot 31. Via the second sensor 10, it is detected that the pallet 30 is positioned on the clamping chuck 1, while the third sensor 11 in its turn detects that the actuating piston 18 is in its raised position. Consequently, a "1" signal exists at both the second sensor 10 and the third sensor 11. At the first sensor 9 there is again a signal that is proportional to the deformation of the clamping chuck 1. When the pallet 30 rests unsecured on the clamping chuck 1, the clamping chuck 1 does not undergo any measurable or significant deformation, as is discernible on the basis of the signal present at the first sensor 9. Based on the pending signals, the release may be issued to the clamping chuck 1 to clamp the pallet 30.

Figure 6:
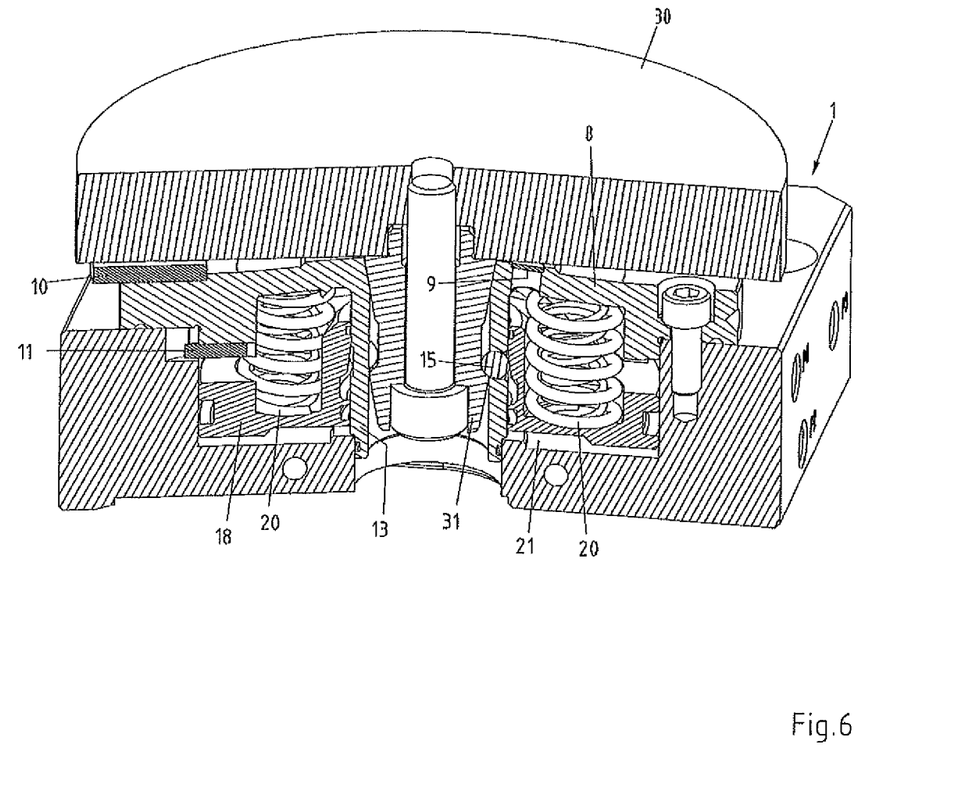
FIG. 6 the abstracted clamping chuck together with the pallet clamped thereon.

FIG. 6 shows a cross-section along line A-A in FIG. 2 of the clamping chuck 1 together with the pallet 30 clamped securely. In order to clamp the pallet 30 securely on the clamping chuck 1, the overpressure built up inside the pressure chambers 21 must be dissipated. As soon as the pressure in the pressure chamber 21 falls below a certain minimum level, the actuating piston 18 is pressed downwards under the effect of the compression springs 20. The clamping balls 15 are pressed inwards by the actuating piston 18. The clamping balls 15 bear on a ridge of the clamping spigot 31, causing it to be drawn further into the locating opening, where it is clamped securely. At the same time, the underside of the pallet 30 comes to rest immovably on the Z-supports of the clamping chuck 1. The clamping chuck 1 is deformed under the effect of the clamping balls 15 engaging with the clamping spigot 31. Since the outward region of the pallet 30 rests on the Z-supports, the cover plate 8 in the middle region is pressed upwards towards the pallet 30 resting on it by the clamping balls 15 which are braced axially against the hollow-cylindrical extension 13. Consequently, the clamping chuck 1, or the cover plate 8 thereof is deformed elastically, particularly the middle region thereof, which can be measured by means of the first sensor 9. This deformation is shown exaggerated in FIG. 6. Of course, other regions of the clamping chuck 1 will be deformed elastically when the pallet 30 is clamped. However, experiments have shown that the region in which the first sensor 9 is arranged is particularly advantageously suitable for measuring the elastic material deformation of the clamping chuck 1 and for drawing conclusions about the pull-in force. The force with which the clamping spigot 31 is pulled downwards, i.e. into the locating opening is referred to as clamping and pull-in force. The elastic material deformation measured enables the pull-in force to be determined relatively precisely. At the same time, a statement can also be made as to whether the pallet 30 is clamped on clamping chuck 1 correctly and with sufficient clamping force. At all events, the first sensor 9 delivers an output signal which is at least approximately proportional to the clamping force. Experiments in this regard have shown that the clamping force is calculated with an accuracy in the order of 0.3 kN for a clamping force in the order of 15 kN. Of course, the clamping force depends on the structure and size of the clamping chuck. With large clamping chucks the clamping force may easily reach a value several times greater than the 15 kN indicated, while correspondingly lower clamping forces are generated with smaller chucks. Regardless of the clamping force, however, high resolutions are achievable with a DMS sensor of the type described, so that ultimately the absolute clamping force cam be determined with high resolution and accuracy.

Figure 7:
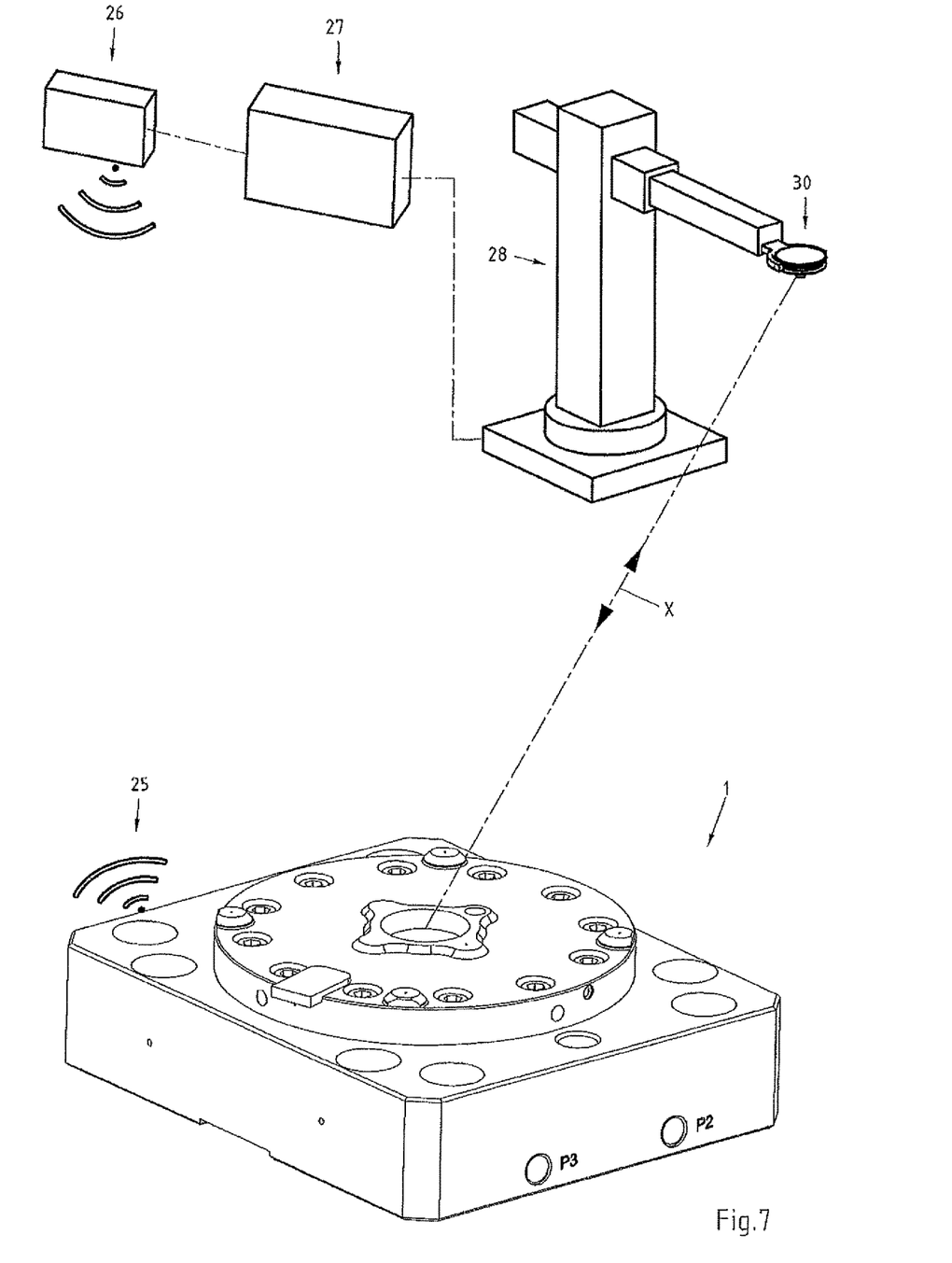
FIG. 7 the clamping chuck together with a receiver, a gateway and a robot.

FIG. 7 is a schematic representation of the clamping chuck 1 according to the invention together with individual elements/components of a manufacturing system. Besides the clamping chuck 1, a receiver 26, a gateway 27 and a handling robot 28 are illustrated, wherein the individual elements are not represented true to scale. The generally known and commonly used technical term gateway is used to refer to a transfer point as a switching device, particularly a switching device in computer networks. The gripper of the handling robot 28 holds a schematically illustrated pallet 30.

The transmitter 25 installed in the clamping chuck 1 transmits the measurement data and the measurement values pending at the sensors to the receiver 26, as is indicated by the schematically drawn radio waves. The receiver 26 forwards the received data to the gateway 27. The gateway 27 is in turn connected to the handling robot 28. The gateway 27 receives the data processed by the microprocessor control of the transmitter 25, such as chuck open, no pallet present, pallet in position, pallet clamped, pallet clamped with 10 kN, etc. Based on the transmitted, data, the gateway 27 is able to deliver a command to the handling robot 28, such as transfer pallet 30 to the clamping chuck 1 or remove pallet from the clamping chuck 1, as is indicated by the line X with arrows.

If the pallet is not clamped securely in clamping chuck 1 with a minimum clamping force, an error message may be output by the transmitter 25. Alternatively, the gateway 27 may detect that the minimum clamping force has not been reached and output an error message and/or initiate appropriate measures.

Of course, FIG. 7 shows only one exemplary configuration. For example, a clamping chuck according to the invention may be integrated in practically any production line and networked with other components such as a control system or a workpiece store—warehouse—or directly with the processing machine.

Depending on requirements, the calculated signals may also be linked to each other to enable a decision to be reached. For example, if it is detected that a pallet is in position but not securely clamped, the release to clamp may be issued to the clamping chuck for example. On the other hand, the release to the handling robot for removing the pallet from the clamping chuck may be withheld until a pallet is located on the chuck but no longer securely clamped.

At all events, a clamping chuck designed according to the invention offers an enormous variety of capabilities. Thus, in addition to the measurement data described previously, additional data may also be calculated by providing additional sensors, for example. For example, an additional sensor might be provided by means of which processing data stored on the pallet is read in and transmitted. A sensor for determining the shape and/or size of the pallet might also be provided, which might be particularly helpful for large clamping systems with multiple clamping chucks. The data obtained may also be evaluated in very many different ways, for example by determining the number of clamping operations for the respective clamping chuck, a change in the clamping force, particularly a clamping force which diminishes over time, etc. Standard, commercially available proximity switches with mechanical-, inductive-, capacitive-, optical-, ultrasonic-, or magnetic-based operating modes might be used for the second and third sensors for example. Alternatively, a piezoelectric sensor might also be used for the first sensor.

The pallet might optionally be equipped with a chip or similar that can be read out via the clamping chuck and on which processing data, identification codes etc. is/are stored.

For data transmission, a standardised interface such as Bluetooth is used for preference. One of the advantages of a standardised interface such as Bluetooth is that the data transmitted can also be received and processed further and/or forwarded without difficulty using other receivers such as a mobile phone, a PDA or a computer, for example.

Of course, the embodiment described in the foregoing text is not to be considered exhaustive or comprehensive. Thus, the sensor might also be arranged at another location to measure the pull-in force for example. It is only important for the sensor for measuring clamping force that it be placed at a location that is deformed elastically when the clamping spigot is firmly clamped. Additional sensors may also be provided on or in the clamping chuck top monitor further parameters. For example, an acceleration sensor might be attached, with which the clamping chuck might be monitored for the impacts/vibration to which it is exposed while a workpiece is being processed. The provision of a temperature sensor is also entirely conceivable. The data from the further sensors might also be transmitted wirelessly via the transmitter.

On the other hand, "simpler" variants of the clamping chuck designed according to the invention are also entirely conceivable, with which for example only the clamping force is monitored, wherein it is not absolutely imperative to capture the clamping force with a high degree of resolution, but wherein it might be sufficient to capture and/or monitor the clamping force in levels, for example in two to ten levels, and to transmit it via the transmitter. Moreover, variants of the clamping chucks are also conceivable in which only two parameters are captured. Thus, application cases are conceivable in which for example the clamping force is captured and/or monitored and the presence of a pallet on the chuck may also be captured. Instead of the provision of four circular Z-support surfaces, of course it might also be possible to provide three or more than four bearing surfaces, wherein the bearing surfaces also do not have to be circular, but might be of oval design instead.

Some advantages of the clamping chuck designed according to the invention are summarised briefly below:

Various parameters of the interaction between the pallet and the clamping chuck and/or of the clamping chuck itself and possibly of the pallet may be monitored and transmitted wirelessly to a remote location;
The transmitted data may be captured, stored, and evaluated externally;
The parameters may be monitored continuously;
The measurement of certain parameters increases process safety, wherein particularly continuous monitoring of the pull-in force allows access to new capabilities in this area;
It may be detected whether a pallet has been deposited on the clamping chuck or not;
It may be detected whether the clamping device or the element serving to actuate the clamping elements has been locked correctly;
Productivity can be increased by monitoring certain parameters;
The risk of damaging the clamping chuck is reduced;
Changes in the clamping chuck over time may be detected;
The clamping chuck can be integrated easily in an automatic manufacturing system;
The entire sensor system is arranged on the clamping chuck, so that the pallets can be produced relatively simply and inexpensively. Thus the pallets are backwardly compatible, i.e. existing and older pallets—workpiece carriers—can also be used together with a clamping chuck designed according to the invention.

The invention claimed is:

1. A clamping chuck for clamping pallets furnished with a clamping spigot, wherein the clamping chuck has a locating opening for the clamping spigot and a clamping device having clamping elements for providing a pull-in force for clamping the clamping spigot in the locating opening, and wherein at least one sensor is arranged on the clamping chuck, by means of which at least one parameter (a) of the clamping chuck and/or (b) of the interaction between the pallet and the clamping chuck and/or (c) of the pallet can be captured, wherein the clamping chuck is equipped with a transmitter for wireless transmission of parameters detected by the at least one sensor, wherein said at least one sensor includes a first sensor configured and operable to detect the pull-in force acting on the clamping spigot.

2. The clamping chuck according to claim 1, wherein the first sensor is configured and arranged on the clamping chuck in such manner that elastic material deformations of the clamping chuck are measurable when a pallet is clamped securely.

3. The clamping chuck according to claim 1, wherein said at least one sensor further includes a second sensor configured and operable to detect; the position of a pallet on the clamping chuck.

4. The clamping chuck according to claim 3, wherein the second sensor is configured and arranged in the region of a top side of the clamping chuck in such manner that the presence of a pallet on top of it can be detected.

5. The clamping chuck according to claim 1, wherein the at least one sensor further includes a second sensor and a third sensor configured and operable to detect the position of an element serving to actuate the clamping elements.

6. The clamping chuck according to claim 5, wherein the clamping device is provided with an actuating piston which is movable between a starting position and a locking position for actuating the clamping elements, and wherein in the locking position the actuating piston pushes the clamping elements radially inwards to bear on the clamping spigot in a force-locking manner, wherein the third sensor is arranged inside the clamping chuck in such manner that the location of the actuating piston in the starting position can be detected.

7. The clamping chuck according to claim 1, wherein the first sensor includes strain gauges.

8. The clamping chuck according to claim 7, wherein the first sensor is attached to the clamping chuck in force-locking and/or materially bonded manner such that the signal therefrom is essentially proportional to the clamping force.

9. The clamping chuck according to claim 1 wherein a top side of the clamping chuck is provided with Z-supports for the pallet, wherein the Z-supports are arranged radially outside the locating opening, and wherein the first sensor is arranged radially between the locating opening and a circular line which intersects the Z-supports.

10. The clamping chuck according to claim 1, wherein, the clamping chuck is provided with a hollow-cylindrical extension which delimits the locating opening radially, wherein the extension is furnished with radial bore holes), in which the clamping elements are braced in the Z-direction in form-locking and/or in force-locking manner.

11. The clamping chuck according to claim 1, further comprising an actuating piston which is movable between a starting position and a locking position for actuating the clamping elements, wherein the actuating piston pushes the clamping elements radially inwards, so they bear on the clamping spigot in force-locking manner, wherein the actuating piston is displaceable into the locking position by compression springs and displaceable pneumatically into the starting position against the force of the springs.

12. The clamping chuck according to claim 1, wherein a microprocessor control is integrated in the clamping chuck, the microprocessor is configured and operable to evaluate data collected by the at least one sensor before said data is forwarded to the transmitter.

13. The clamping chuck according to claim 1, wherein the clamping chuck is provided with a power supply, in the form of batteries, for at least the transmitter and for the at least one sensor.

\* \* \* \* \*